(12) United States Patent
Niederer (10) Patent No.: US 8,000,022 B2
(45) Date of Patent: Aug. 16, 2011

(54) LIQUID LENS SYSTEM

(75) Inventor: David Niederer, Küttigen (CH)

(73) Assignee: Optotune AG, Dubendorf (CH)

( * ) Notice: Subject to any disclaimer, the term of this patent is extended or adjusted under 35 U.S.C. 154(b) by 0 days.

(21) Appl. No.: 12/670,066

(22) PCT Filed: Aug. 11, 2008

(86) PCT No.: PCT/CH2008/000342
§ 371 (c)(1),
(2), (4) Date: Jan. 21, 2010

(87) PCT Pub. No.: WO2009/021344
PCT Pub. Date: Feb. 19, 2009

(65) Prior Publication Data
US 2010/0202054 A1    Aug. 12, 2010

(30) Foreign Application Priority Data
Aug. 11, 2007  (EP) ..................... 07015839

(51) Int. Cl.
G02B 3/12 (2006.01)
G02B 1/06 (2006.01)
(52) U.S. Cl. ..................................... 359/665
(58) Field of Classification Search ........... 359/665–667
See application file for complete search history.

(56) References Cited

U.S. PATENT DOCUMENTS

| | | | |
|---|---|---|---|
| 4,783,155 A * | 11/1988 | Imataki et al. | 359/666 |
| 4,802,746 A | 2/1989 | Baba et al. | |
| 4,890,903 A | 1/1990 | Treisman et al. | |
| 5,446,591 A | 8/1995 | Medlock | |
| 5,917,657 A * | 6/1999 | Kaneko et al. | 359/661 |
| 6,542,309 B2 * | 4/2003 | Guy | 359/666 |
| 2002/0154380 A1 | 10/2002 | Gelbart | |
| 2003/0095336 A1 | 5/2003 | Floyd | |
| 2006/0164731 A1 | 7/2006 | Wu et al. | |
| 2007/0263293 A1 | 11/2007 | Batchko et al. | |
| 2008/0112059 A1 * | 5/2008 | Choi et al. | 359/664 |
| 2008/0144185 A1 | 6/2008 | Wang et al. | |
| 2009/0002838 A1 | 1/2009 | Yokoyama et al. | |

FOREIGN PATENT DOCUMENTS

EP   1 925 963   5/2008
(Continued)

OTHER PUBLICATIONS

Zhang et al., "Fluidic adaptive lends with high focal length tunability," *Applied Physics Letters*, 82(19):3171-3172 (2003).

(Continued)

*Primary Examiner* — Darryl J Collins
(74) *Attorney, Agent, or Firm* — Marshall, Gerstein & Borun LLP (57) ABSTRACT

The invention is directed to an optical system (1). The optical system (1) has a housing (2) with an opening (3) extending through the housing (2) encompassing an in general constant volume (V). A membrane (6) with two or more membrane sections is arranged across the opening separating the volume (V) in a first and a second chamber (7, 8) filled with at least one fluid. The membrane is attached to an annular holding frame (9). An actuator is interconnected to the membrane (6) directly or indirectly to change the optical behaviour of the membrane.

13 Claims, 8 Drawing Sheets

FOREIGN PATENT DOCUMENTS

| | | |
|---|---|---|
| GB | 1 327 503 | 8/1973 |
| JP | 1-166003 | 6/1989 |
| JP | 1-166004 | 6/1989 |
| JP | 10-144975 | 5/1998 |
| JP | 11-133210 | 5/1999 |
| JP | 2000-81504 | 3/2000 |
| WO | WO-2005/096028 A1 | 10/2005 |
| WO | WO-2006/011937 A2 | 2/2006 |
| WO | WO-2007/049058 A2 | 5/2007 |
| WO | WO-2008/020356 A1 | 2/2008 |

OTHER PUBLICATIONS

Ren et al., "Tunable-focus liquid lens controlled using a servo motor," *Optics Express,* 14(18): 8031-8036 (2006).

Written Opinion of the International Searching Authority in corresponding International Application No. PCT/CH2008/000342, filed Aug. 11, 2008.

* cited by examiner

LIQUID LENS SYSTEM

FIELD OF THE INVENTION

The present invention relates to an optical system according to the preamble of patent claims.

BACKGROUND OF THE INVENTION

Adjustable optical lens systems comprising fluids are known from the prior art.

WO07049058 for example, was published in May 2007 and is directed to a lens with a variable focus, which comprises a rigid ring to which a flexible membrane is attached. A rigid transparent front cover is attached to the flexible membrane and a rigid rear cover on the rear surface of the ring. A cavity is formed between the flexible membrane and the rear cover which is filled with a liquid. The amount of liquid in the cavity can be adjusted to vary the curvature of the flexible membrane and so vary the optical characteristics of the lens. A second flexible membrane can be positioned between the rear cover and the ring.

US2006164731AA was published in July 2006 and shows another example of a lens with a variable focus which is based on a liquid-filled chamber (cell). The liquid lens cell consists of four parts, namely a clear distensible membrane, a transparent wall membrane, a liquid with a fixed volume stored in the lens cell chamber and an annular periphery sealing ring. The radius of the annular sealing ring is changeable, similar to a conventional iris diaphragm. By tuning the radius of the annular sealing ring, the stored liquid in the lens cell will be redistributed and thereby change the curvature of the distensible membrane. One disadvantage consists in that the liquid lens is influenced by gravity forces and vibrations.

WO06011937 was published in February 2006 and is directed to a fluidic adaptive lens device with at least one flexible membrane (indicated as first partition). The adaptive lens includes a first flexible and optically transparent membrane. A second partition, which is coupled to the flexible membrane, is at least partially optically transparent. A first cavity is formed in between the flexible membrane and the second partition. The lens device comprises a fluid within the cavity. Furthermore the device comprises means, e.g. a teflon coated screw, to control the pressure or the volume of the fluid in the chamber. When the parameter of the fluidic medium changes, the membrane flexes and the optical property of the lens changes.

US2003095336 was published in May 2003 and describes a lens arrangement mainly for a corrective or a prescription lens. The prescription lens is adjacent to a fluid cell which has a flexible membrane and a base. In that fluid is pumped into or out of the fluid cell the corrective power of the entire lens arrangement is varied. The device is only limitedly suitable for miniaturisation.

U.S. Pat. No. 5,446,591 was published in August 1995 and discloses a further adjustable lens assembly for a telescope objective. The device comprises a liquid lens element contained between adjacent glass lens elements. Liquid is introduced into the gaps between adjacent glass lens elements to form the liquid lens elements.

U.S. Pat. No. 4,890,903 was published in May 1987 and is directed to an adjustable liquid lens or mirror which has a chamber delimited by a flexible membrane. The flexible membrane is supported in tension between a pair of resilient rings. A first fluid medium fills the chamber which, in the case of a lens, has a different refractive index from that of a second fluid medium contacting the other side of the flexible membrane. An annular support member for the flexible membrane comprises relatively movable first and second component parts, these first and second component parts of the support member being adjustably linked in a fluid-tight manner, whereby the volume of the chamber is adjustable by moving one component part of the support member relative to the other in such a way as to vary the pressure in the first fluid medium and thereby to alter the shape of said membrane surface.

U.S. Pat. No. 0,154,380 A1 was published in October 2002 and discloses micro-machined devices, acting as electro-mechanically tuneable concave lenses. The lens-body itself is made of media including electrically conductive and transparent electrodes, as indium tin oxide, and a membrane separating two regions of differing refractive index. By applying a voltage over the electrodes, within the lens-body, an electrostatic force acts over the within certain ranges flexible electrodes, the lens-body in between is reduced in its thickness, and the optical properties are therefore changed.

JP 144975 A was published in May 1998 and describes a tuneable liquid-filled lens, using a ring-shaped piezo actuator. In the inner opening of the actuator, a transparent cover allows the light to pass trough, while the outer rim is fixed on an rigid ring with a certain depth. In the centre of the ring, in opposite direction of the piezo actuator, a flexible and transparent membrane encompasses with the actuator a liquid-filled space, and with applying a voltage on the actuator, the spanned volume changes. With changing the volume, the membrane deflects in one direction and builds a calotte-shaped, tuneable lens.

WO 096028 A was published in October 2005 and describes a tuneable, liquid-filled lens using a ring shaped piezo actor as well. Here, a laterally generated deflection of the piezo alters the diameter of a cylindrical liquid volume. The constant volume of the liquid itself creates a pressure on a neighbouring and immiscible liquids with same density but different refractive index. With applying a voltage on the piezo, the interface of the liquids changes its position, and a tuneable lens is generated.

GB 1327503 A was published in August 1973 and describes a piezo-driven, tuneable liquid-lens. A certain volume of liquid encompasses a closed cylindrical and piezoactive box, optically transparent in the axial direction. The liquid itself is encompassed by a rigid box, on one top closed by an elastic and trans-parent membrane. By applying a voltage on the piezo, the inner volume is changed, and the membrane deflected, and therefore a tuneable lens is generated.

U.S. Pat. No. 164,731 A1 was published in July 2006, and describes a tuneable liquid-filled lens, where the volume of a cylindrical chamber is changed by mechanically tuning the diameter of the wall. In the axial direction, the system is closed by flexible membranes, allowing to deflect while changing the diameter of the box. In that way, a tuneable lens easily can be generated.

WO08020356 was published in February 2008 and is directed to a variable focus lens. The lens comprises a container having an interior chamber. A first fluid medium and a second fluid medium are disposed in the chamber and are separated by a meniscus. A meniscus control system, for controlling a shape of the meniscus, comprises a first control element and a second control element. The first control element is coupled to the meniscus and is moveable in a direction substantially parallel to the optical axis. The first control element and the second control element are configured to interact using an electric field or a magnetic field. The interior chamber may be a closed chamber without any elements extending through the wall of the chamber. Hence, a chance of leakage of the fluid media from the chamber is reduced. One problem results from the sealing between the first control element and the side wall of the chamber.

One disadvantage of optical lens systems known from the prior art consists in that they have a complicated setup with means to exchange fluid such that relative internal pressure and volume can be influenced.

It is an object of the present invention to provide an improved liquid lens system having a simple and robust setup.

An embodiment of a lens system according to the present invention is, unlike the lens systems known from prior art, an in principle closed system with at least one main chamber arranged inside an outer housing. The at least one main chamber is at one side delimited by a flexible membrane with respect to at least one additional chamber or the outside. The at least one chamber is normally completely filled with a fluid (gas and/or liquid) having the same or different index of refraction then the fluid present in the adjacent area.

Under a closed system in the sense of the present invention a system is understood where no exchange of fluids with the outside (external exchange) is necessary during normal operation. However, if appropriate, a certain amount of fluid can be exchanged with the outside e.g. for adjustment reasons of the initial position or shape of the membrane. The at least two chambers and thereby the therein contained fluids are delimited with respect to each other at least partially by a flexible membrane. Depending on the field of application, the membrane can be designed as one continuous membrane or a membrane consisting out of sections having the same or different mechanical and optical properties. The shape, respectively the deflection of the membrane (barrier layer) between the fluids and thereby the optical properties of the system are adjustable via an actuator which is mechanically interconnected to or integrated in the at least one membrane. In special applications part of the membrane can be formed as a rigid part e.g. if it becomes necessary to deflect the barrier layer in a parallel manner (e.g. in phase shifting applications). The actuator can be completely integrated into an outer housing of the lens system or arranged at least partially outside. Good results are obtained by actuators which act upon the membrane based on Coulomb forces or by magnetic actuators which act upon the membrane from the outside.

One embodiment of a lens system normally comprises on one side of a membrane several chambers or areas which are interconnected to each other e.g. via channels or openings to exchange volumes of fluid within the system and to thereby influence the optical characteristics of the lens system. In that the chambers inside the lens system are normally filled by a constant amount of fluid, gravity forces and thereto related local deformation can be compensated because the fluid pressure is in certain tolerances everywhere in the system the same. Unlike the embodiments known from prior art an optical system according to the invention is normally not position-dependent and gravity forces have not negative influence. In that the at least one actuator means to deform the volumes of fluid is integrated into the system, it is possible to avoid external reservoirs. In addition a sealed system offers the advantage that contamination can be avoided. In that the membrane separates the at least two chambers with respect to itself or the at least one chamber with respect to the surrounding, a simple and yet efficient construction is possible. No sealing problems as know from the prior art occur.

A lens system according to the invention has in general an outer housing with a central main opening extending axially through the housing. The opening can be closed at least on one side by a rigid or flexible panel made of optically active or transparent material as glass, plastics, elastomers or metals. If appropriate, several lens systems may be lined up next and optically interconnected to each other. Thereby it becomes possible to omit certain separating panels. The panel itself may be shaped as a lens or comprise diffractive refractive or reflective structures. Alternatively or in addition further lenses which can be variable or fixed focus may be foreseen to influence the light path.

In certain embodiments a CCD-array (or a similar device) may be integrated in the lens-system forming together a complete module. If appropriate the module incorporates electronic circuits to control the actuation and the focus of the system and/or to process picture information recorded by the CCD-array.

At least one membrane is arranged in the opening of the housing, if appropriate in a stretched and/or prestretched manner under tension, extending across the opening and thereby separating the opening in axial direction in two opposite chambers. The membrane contains at least two regions of in general antiparallel deflection during actuation, and may be prestretched and/or the shape may be determined by the relative amount of liquids filled into the chambers. Depending on the field of application more than one membrane may be present. At its outer end the membrane is normally fixed to the outer housing. As will be explained subsequently in more detail, the membrane may be stretched and fixed to additional holding means (annular holding frames) which are arranged inside the opening to delimit certain areas. Depending on the field of application, the membrane is arranged at least partially in an non-planar way.

The membrane is normally attached to additional holding means whereby areas of the membrane with higher tension/strain may be adjacent to areas of the membrane with lower tension/strain. In a process for the making of a lens system this can be achieved in that a membrane is stretched to a first extent, then fixed to e.g. a frame-like holding means. The area of the membrane surrounding the holding means is then stretched to a second extent. Stretching may take place by mechanical means or thermal means (e.g. by hot gas or radiation). Alternatively or in addition the initial position of the membrane may be determined by filling the at least one chamber with a fluid.

In an embodiment of the lens system, a ring-shaped holding frame which acts as holding means is arranged inside the opening of the housing to which the membrane is attached in a concentric manner. The membrane is attached to the ring-shaped holding frame. Depending on the field of application, the area of the membrane arranged inside the holding frame is normally less stretched than the outer area of the membrane arranged between the holding frame and the housing. The area of the membrane inside the holding frame is optically active and adjustable with respect to its optical characteristics. The optical characteristics of the lens system are adjusted by an actuator which is interconnected directly or indirectly to the optical active part of the membrane. In that the optically active element is subjected to less strain than the outer area of the membrane, the outer area of the membrane and the axial position of the annular holding means dominates the geometry of the optical active inner part of the membrane via the displacement of fluid. In an embodiment an actuator acts directly upon an annular outer part of the membrane surrounding the holding frame causing a deflection of said part of the membrane. The deflection of the optical active part of the membrane arranged inside the holding frame is caused indirectly by the fluid arranged in the chambers on both sides and thereby mechanically coupling the membranes. In that part of the fluid is displaced by the actuated movement of the outer part of the membrane, the position of the holding means or combinations thereof, the optical active inner membrane is deflected as a result thereof.

In an embodiment the optical active part of the membrane has a calotte shape with a certain radius. This is achieved by the different strain (resp. stress) in the different sections of the membrane and the relative amount of fluid filled in the chambers. In that the actuator changes the relative strain in the different sections of the membrane fluid is moved in the at least one chamber and due to the tendency of the membrane material to contract, the shape of the calotte is altered, e.g. by decreasing or increasing the radius. By the thickness distribution of the membrane, it is possible to influence the shape of the calotte, to e.g. parabolic or another appropriate design. Thereby it becomes possible to correct optical errors.

Good results are achieved by actuators in form of two electrodes in general arranged opposite to each other on either side of the membrane or a section thereof. Alternatively or in addition the membrane can be covered by a magnetic layer or be made out of a magnetic layer itself such that the membrane can be deflected by a magnetic field. At least one electric coil arranged inside or outside of the housing suit to deflect the membrane. The actuator encompasses the elastically deformable and if appropriate prestretched membrane, e.g. consisting of elastomeric material. Depending on the embodiment, the electrodes are arranged sufficiently electrically isolated with respect to each other to avoid negative flow of current.

In the case that the membrane is covered by two opposite electrodes, by applying a voltage between the first and the second electrode, the intermediate layer in the area between the first and the second electrode is compressed by coulomb forces, respectively Maxwell Stress causing a local reduction of thickness (first direction) of the prestretched membrane material. The poisson's ratio of the membrane material causes a lateral, in-plane expansion of the membrane (secondary deformation). If appropriate, further deformations may be superimposed. The lateral expansion causes an out-of-plane deflection of the normally stretched membrane such that the characteristics of the optically active membrane changes in a determined manner.

To obtain special optical effects the membrane can be three dimensionally shaped or have a variable thickness or contain diffractive, refractive, reflective scattering or absorbing structures. Alternatively or in addition other optical functions such as phase shifting functions, tuneable micro-lens arrays or tuneable mirrors may be implemented. If appropriate the membrane can be made section wise out of different materials or layers. Good results are obtained in that the membrane consists out of commercially available VHB4910, VHB 4905, VHB 9460 tape of 3M. This material has a refractive index in the range of 1.47. Good results are also obtained, using elastic membranes containing silicon, silicon gels or urethanes.

A device to correct lens errors can be obtained in that a membrane is arranged inside of a housing separating the housing into a first and a second chamber which are filled by liquids having in general a similar index of refraction and the membrane is made out of a material having a different index of refraction. In that the membrane is deflected as described above, e.g. such that it forms a calotte, it is achieved that the optically active part of the membrane has in the centre a lower inclination which increases with the distance to the centre (in radial direction). The light passing through the lens system faces a longer path in the outer area then in the centre. Thereby it is e.g. possible to compensate an optical error of an interconnected lens or another optical device. To optimize the effect, the membrane may contain a thickness distribution, acting as a flexible lens itself. Depending on the setup such as the design of the membrane it is possible to compensate aberrations such as spherical or chromatic aberration.

A phase shifting device can be obtained in that an elastic membrane as described above comprises an non-deformable planar centre part which is deflectable by an actuator in axial direction (along the path of the light). The device comprises at least two chambers which are filled by fluids having different index of refraction. In that the planar centre part is deflected it is achieved that the path of the light in the different media changes which results in a phase shifting effect. The planar centre part can be made out of a transparent or a reflective material.

An adaptive microlens array can be obtained by arranging a rigid, and non-deformable centre part, containing an arrangement of small openings, which are covered by an elastic, and deformable layer of optically transparent material. By changing the volume of fluid within the inner chamber, the shape of the deformable layer over the openings is altered, and the optical properties of the device is affected.

In that light-absorbing fluids is filled in the at least one chamber, the intensity distribution of a light beam can be affected. Here, as a function of the lateral position, the optical path within the absorbing fluid is varied and therefore the total absorption on a specific optical path within the inner chamber is controlled.

In a lens system according to the present invention the membrane can be coated with an antireflection layer. The at least one membrane can have a multi-layered setup whereby the index of refraction of the individual layers as well as the thickness of the layers may be adjusted such that reflected beams are eliminated by destructive interference.

A coatings may be applied in different manners to the surface of the membrane and/or the housing. Good results are obtained by conventional methods such as vapor deposition, plasma coating, doping, self assembled monolayers (SAM's), Langmuir Blodgett Films, amphiphile Surfactants or spin coating. A method is the application of certain 3D structures on the membrane itself. By structuring the surface with adequately distributed pimples or objects in sub-wavelength range, an antireflection effect can be generated. Methods to generate the effect is etching the membrane, casting or application of particles on the membrane.

If appropriate the molecules of the coating may have a certain solubility in the fluid present in one of the adjacent chambers and a sedimentation may occur onto the surface of the membrane. The similar effect can be achieved in that a highly viscose liquid layer with a high chemical affinity to the material of the elastic material and with a low solubility in the surrounding liquid (fluid) is applied to the surface of the membrane. E.g. a layer of oil is applied onto a lipophilic surface of a membrane.

A lens system according to the invention may be used in applications, where the compact control- and steering mechanism for changing focal distances is of interest, as in hand held devices, such as cellular phones or personal digital assistants, projectors, cameras, objectives for optical measurements, high power laser control applications, interferometers, displays or microscopes. Using appropriate materials, e.g. biocompatible materials, it can be used for medical applications or implantation in mammalians, for corrections of visual faculty. In contrast to the prior art, one advantage consist in that a lens system according to the invention can easily be miniaturized or scaled in size.

The fluid arranged in the chambers is preferably out of the group of silicone oil, oils, solvents, water, transparent or reflective liquids, gas. If appropriate it is possible to substitute the fluid at least partially by a gel such as e.g. Silgel 612 A&B of Wacker, or Sylgard 527 or Sylgard 528 of Dow Corning. Gel has the advantage that sealing is less a problem. Preferably at least one of the fluids is of an incompressible type, such as liquids, e.g. oil or water. For certain applications, the fluid may contain particles or objects to affect the optical behaviour. Such a dispersion can be used to strongly affect the propagation and spreading of electromagnetic waves which differ from visual range. The lens system therefore can be used for different electromagnetic wave spectra.

In that one chamber of the lens system is filled by a reflective material such as mercury, it is possible to make a mirror type of lens system. Alternatively or in addition the membrane itself can be coated by thin, flexible or liquid metals as alloys made of Gallium, Indium and Tin as "Galinstan" or other eutectic alloys or consist of a reflective material itself. The same effect can be obtained by simply placing a mirror on one side of the optical active part.

If appropriate the membrane can be made out of a semipermeable material which allows the passage of gas inside a liquid arranged in the at least one chamber. Due to the higher internal pressure of the liquid in the chamber the gas is forced out of the chamber through the membrane. Gas bubbles having a negative effect can thereby be omitted.

If appropriate, e.g. in beamers or high performance spot lights, the lens system can be cooled by a closed cooling circuit and/or by convective type of cooling. The cooling circuit is preferably isobaric to not influence the position of the membrane in an unintentional manner.

A process for making a lens system according to the present invention with a prestretched membrane in general comprises the following process steps:
1. Stretch a membrane material to a first extent;
2. Attach the stretched membrane material to an holding frame, resp. an annular holding frame;
3. Stretch the membrane surrounding of the holding to a second extent;
4. Arrange the membrane in an opening of a housing and attach the membrane to the housing;
5. Depending on the embodiment, attach opposite electrodes and/or at least one magnetic layer to a section of the membrane;
6. Fill a chamber delimited by a first side of the membrane with a first fluid having a first refractive index such that the part of the membrane stretched to a first extent forms a calotte;
7. Depending on the embodiment, fill a second chamber delimited by a second side of the membrane with a second fluid having a different refractive index.

If appropriate the membrane is not arranged in a prestretched manner during making but is brought into a stretched shape by filling an appropriate amount of fluid into the chambers. The initial position may be determined by the relative amount of liquid filled into the chambers adjacent to the membrane.

If appropriate, the liquid can be filled in the chambers, before fixing the membrane holders. In that way, the final shape is generated during the assembly process itself. In that the material of the membrane is made out of a semi-permeable material, trapped air bubbles can diffuse through the membrane.

The application of a vacuum enables a faster degassing. This production method enables so-called wafer-level processes.

An embodiment of the invention is directed to an optical system comprising a housing with an opening extending in axial direction. At least one membrane is arranged across the opening, defining at the inside of the housing at least one chamber filled with an in general constant amount of a fluid. The membrane comprises an optically active and an optically passive section and at least one actuator to influence the geometry of the optically active section of the membrane preferably by relocation of the fluid, thereby changing the optical characteristics of the optical system. The optically active and the optically passive sections of the membrane are normally attached to at least one annular holding frame. In preferred embodiments the optically active and the optically passive sections of the membrane are attached to the same annular holding frame. The annular holding frame separates the membrane in an optically active and an optically passive section. In an embodiment the actuator is interconnected to the optically passive section of the membrane. Alternatively or in addition an actuator is interconnected to the annular holding frame to displace the annular holding frame in axial direction. The annular holding frame may be arranged at a certain distance to an inner side surface of the opening. In an embodiment the actuator to displace the membrane consists out of at least two electrodes which are interconnected to the membrane, electrically isolated with respect to each other and encompassing at least partially one section of the membrane. Good results are obtained if the electrodes are made out of metallic powders, conductive eutectic alloys, carbon black or an optically transparent electrode material. In an embodiment the at least one membrane separates the inside of the housing into a first and a second chamber filled with a first and a second fluid having the same or a different index of refraction. If appropriate, the optically active part of the membrane can contain rigid, absorbing, refractive, diffractive, diffusive or reflective structures. Depending on the field of application, the membrane is arranged perpendicular to the axis of the opening or at a certain angle to it.

BRIEF DESCRIPTION OF THE DRAWINGS

The herein described invention will be more fully understood from the description given herein below and the accompanying drawings showing embodiments which should not be considered limiting to the invention described in the appended claims. The drawings show:

DESCRIPTION OF THE EMBODIMENTS

Figure 1:
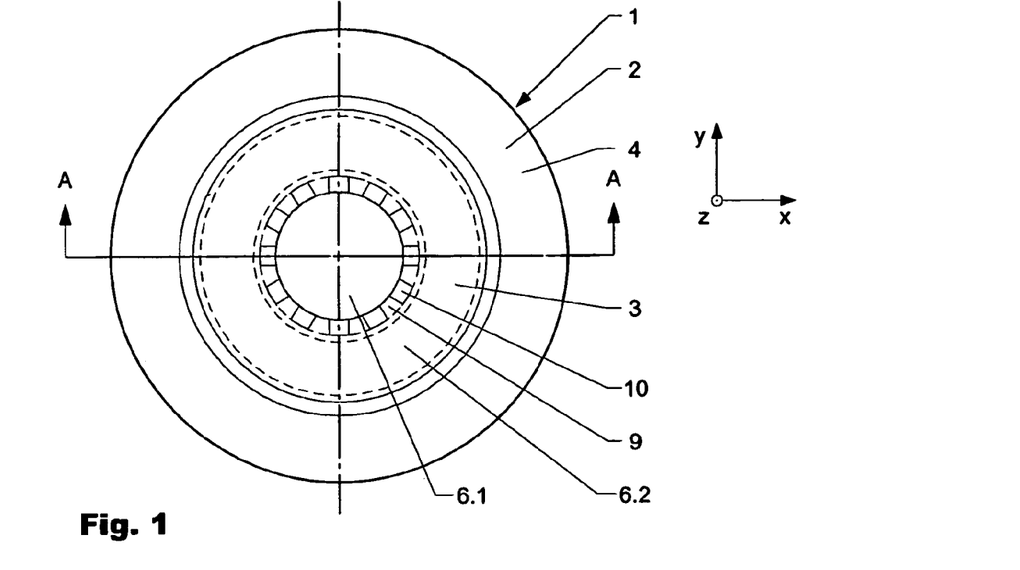
FIG. 1 A first embodiment of a lens system according to the invention in a top view.
Figure 2:
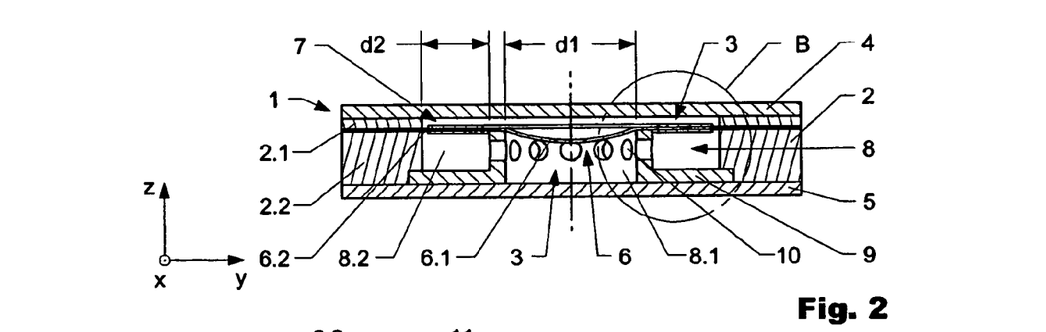
FIG. 2 A cross-cut through the lens system according to FIG. 1 along line AA.
Figure 3:
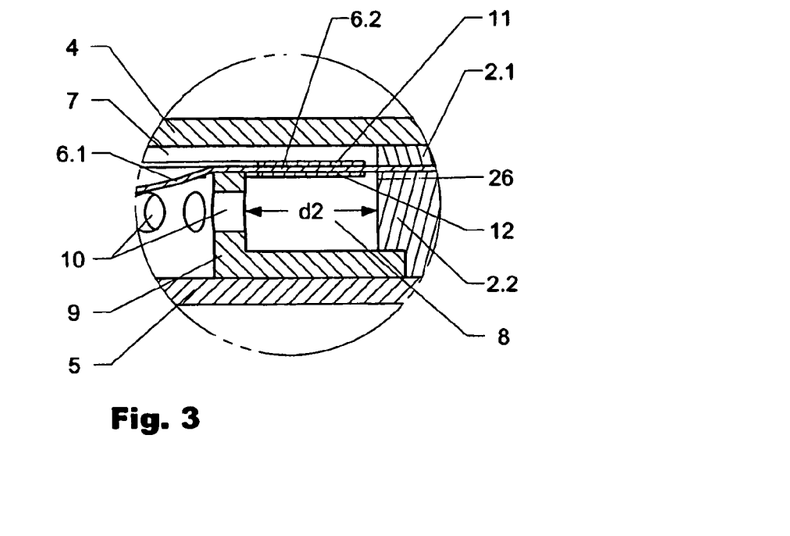
FIG. 3 Detail B according to FIG. 2.

FIG. 1 shows a first embodiment of a lens system 1 according to the invention in a top view, FIG. 2 shows a cross-cut through the lens system along line AA and FIG. 3 shows detail B according to FIG. 2.

The lens system 1 comprises an outer housing 2 with a central opening 3 which extends in axial direction (z-axis) through the housing 2. The central opening 3 is closed on either side of the housing 2 by an upper and a lower rigid panel 4, 5. A membrane 6 separates the opening 3 in a first upper and a second lower chamber 7, 8 which are filled by a fluid (liquid or gas, not shown in detail). In the shown embodiment the membrane 6 is fixed at its outer end in a prestretched manner to the housing 2 by clamping the membrane between an upper and a lower part 2.1, 2.2 of the housing 2. Inside the central opening 3 an annular holding frame 9 is visible which separates the membrane 6 into a first circular inner (with a diameter d1) and a second annular outer area 6.1, 6.2. In the shown embodiment the annular holding frame 9 is arranged concentrically to the outer housing 2 at a distance d2 with respect an inner side wall 26 of the housing 2. Between the inner and the outer area 6.1, 6.2 the membrane 6 is fixed to the holding frame 9. The membrane 6 is mounted in a prestretched manner under elastic tension. During the process of making of the lens system 1, the membrane 6 is stretched in stages such that the elastic tension of the inner area 6.1 is less then the elastic tension of the outer area 6.2. Due to this the outer area is in general flat and the inner area is deflected in direction of −Z. However, in certain embodiments it is not necessary to prestretch the membrane, e.g. when the initial shape is determined by the volume filled in the chambers. The fluid in at least one chamber 7, 8 determines the initial and during operation the relative deformation of the inner and the outer area 6.1, 6.2 of the membrane.

In the shown embodiment the mechanical coupling between the inner and the outer area 6.1, 6.2 of the membrane 6 primarily takes place by the fluid contained in the upper and the lower chambers 7, 8. The annular holding frame 9 comprises openings 10 which allow the exchange of the fluid between a first inner and a second outer part 8.1, 8.2 of the lower chamber 8. In other embodiments the holding frame 9 may be arranged not in a fixedly manner, e.g. displaceable in axial direction.

As can best be seen in FIG. 2, the volume of the upper and the lower chamber is chosen such that the central part 6.1 of the membrane 6 is arranged calotte-like. Due to the reason that the central part 6.1 of the membrane is subjected to less strain than the outer part 6.2 of the membrane, in an initial position the central part is deflected and the outer part is in general not deflected.

As can best be seen in FIG. 3 a first upper and a second lower electrode 11, 12 are arranged opposite to each other annularly encompassing the outer area 6.2 of the membrane 6. Good results are achieved in that the electrodes are made out of carbon black by stamping them onto the membrane, by ion implantation processes, or by the application of flexible or liquid metals such as Galinstan. 6.2. Alternative type of electrodes may be appropriate. The electrodes are electrically interconnected to the outside by electrical connectors e.g. integrated into the frames 9, 2.1, 2.2. By applying a voltage the electrodes 11, 12 attract each other due to coulomb forces, resp. Maxwell stresses, and thereby compress the strained membrane 6.2 arranged in between. Due to the poisson's ratio of the material, the membrane expands laterally thereby increasing its radial and circumferential size. This change in geometry also reduces the strain in the material of the outer annular part 6.2 of the membrane 6. Due to the reason that the stress in the circular inner part of the membrane now exceeds the stress in the outer part of the membrane 6 the deformation of the inner area is reduced and the deformation of the outer area is increased.

Figure 4:
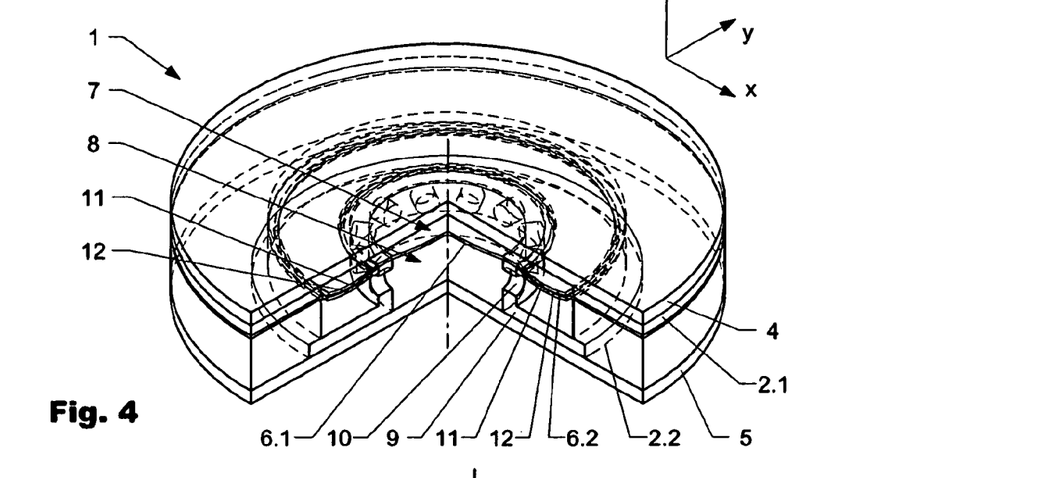
FIG. 4 The embodiment according to FIG. 1 in a perspective manner partially cut.

FIG. 4 shows the lens system 1 according to FIGS. 1 to 3 in a perspective manner. The device 1 is partially cut-open to allow a better view at the inside. The outer annular part 6.2 of the membrane 6 is shown in a deformed manner deviating out of a xy-plane. The holding frame 9 is interconnected to the membrane 6 and separates the membrane into the inner circular part 6.1 with a lower stress and the annular outer part 6.2 with the higher stress. Due to this difference in stress when no deformation is applied, the annular outer part 6.2 dominates the inner circular part 6.1. Because the total volume in the chambers 7, 8 remains the same, the out of plane deformation of the outer annular part 6.2 of the membrane influences the deformation of the inner part via the fluid in the at least one chamber 7, 8. As described above, the deformation is related to the coulomb-force applied by the electrodes 11, 12 which results in a compression of the membrane arranged in a sandwich between the electrodes. This effects in a change of the relative strain proportion between the inner and the outer area of the membrane in that the strain in the inner area of the membrane now exceeds the strain in the outer area of the membrane. Thereby the out-of-plane deformation of the inner area of the membrane is reduced which results in a change of the optical characteristics.

Figure 5:
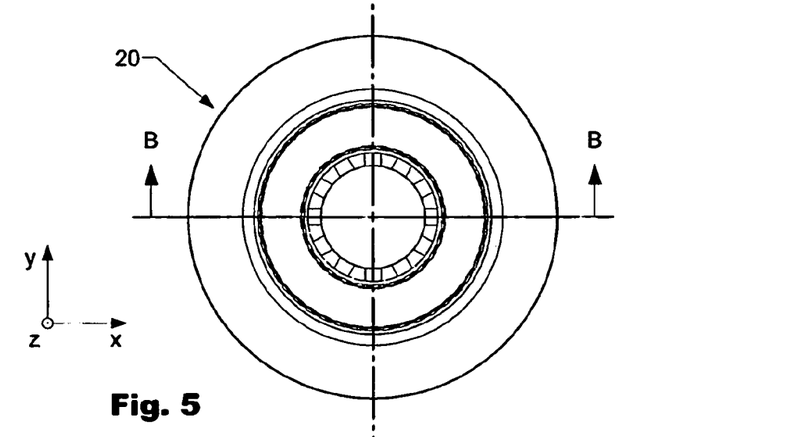
FIG. 5 A second embodiment of a lens system according to the invention in a top view.
Figure 6:
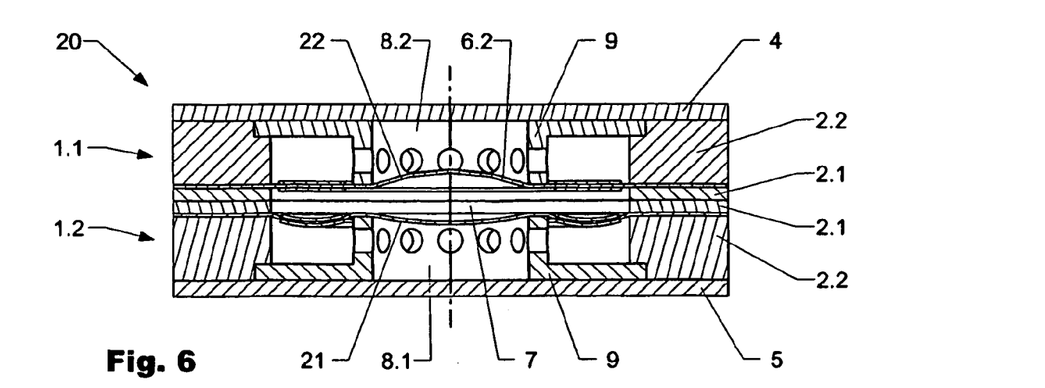
FIG. 6 A cross-cut through the lens system according to FIG. 5 along line BB.

FIG. 5 shows an extended lens system 20 in a top view and FIG. 6 shows the embodiment according to FIG. 5 in a sectional view along line BB. The extended lens system 20 consist out of two lens systems 1.1, 1.2 according to FIGS. 1 through 4 which are functionally interconnected to each other. The two lens systems 1.1, 1.2 are arranged mirror-inverted with respect to each other and share a first chamber 7 which is filled by a first liquid (not shown in detail). The two lens systems 1.1, 1.2 are not separated to each other by a rigid intermediate member. If appropriate it is possible to foresee a separation e.g. in form of a glass panel or a lens (both not visible). Although the outer housings 2 are shown as separate parts, they can be made as one part. On the opposite sides of both membranes 6.1, 6.2 two second chambers 8.1, 8.2 are visible which are filled by fluids (not shown in detail) having different refractive index compared to the first fluid in chamber 7. The volumes of the three chambers 7, 8.1, 8.2 is during operation normally constant. As it can be seen the membrane 21 of the lower system 1.2 is deflected while the membrane 22 of the upper lens system 2.2 is not deflected.

Figure 7:
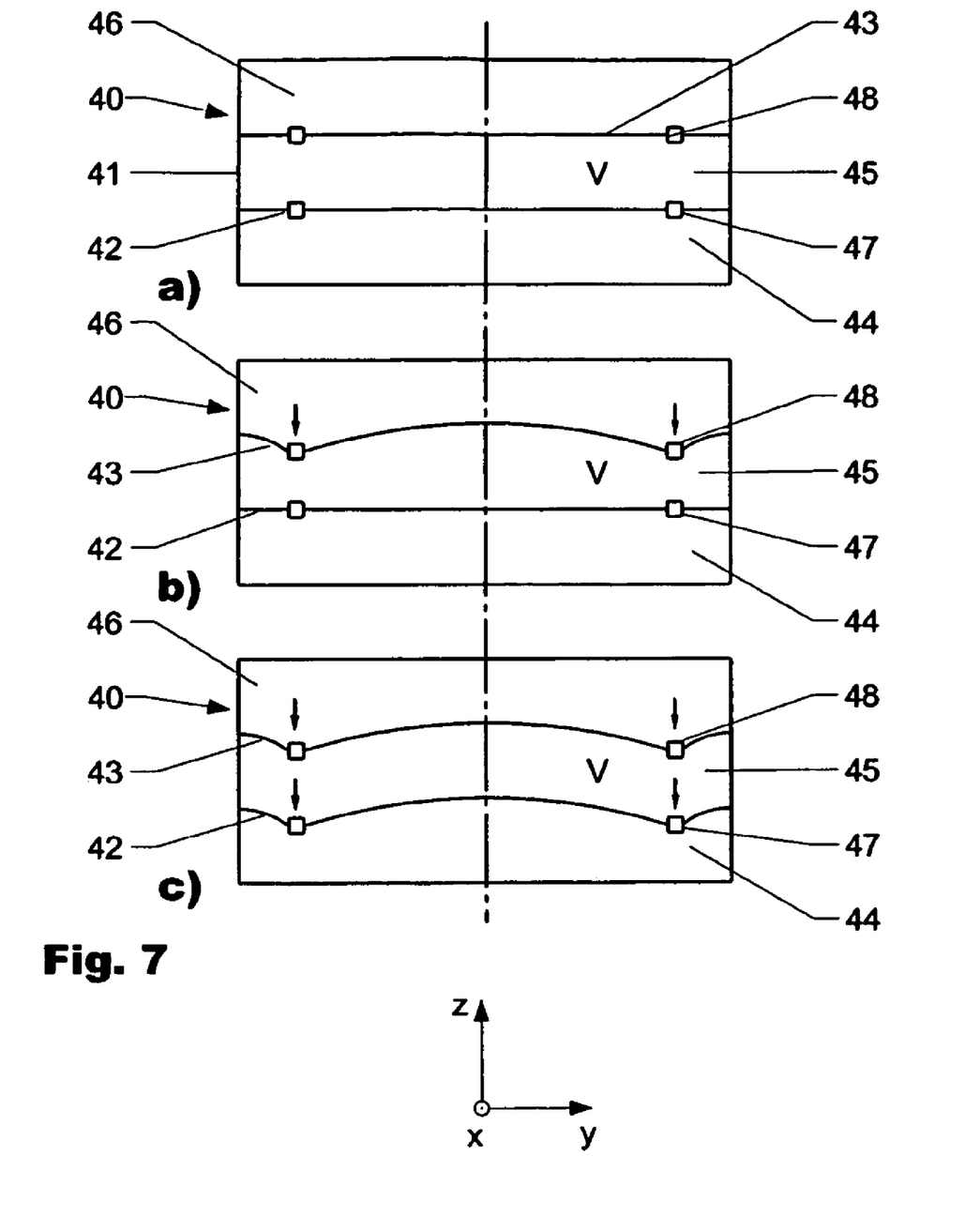
FIG. 7 A third embodiment of a lens system in schematic side view in three different modes of operation.

FIG. 7 schematically shows a third embodiment of a lens system 40 according to the invention in an undeformed manner (FIG. 7a) and in two deformed stages (FIGS. 7b and 7c). The lens system 40 comprises an outer housing 41 which encompasses a volume V which at least during operation is normally constant. Inside the housing 41 a first and a second membrane 42, 43 made out of an elastic material are arranged separating the inner volume of the housing 41 in three chambers 44, 45, 46. The chambers 44, 45, 46 are filled with different fluids having different optical characteristics. Each membrane 42, 43 is attached in a stretched manner to a holding ring (annular holding frame) 47, 48 which in the present embodiment is arranged at a certain distance to the rim of the membrane at an outer rim. In the present embodiment the holding rings 47, 48 have in general the same diameter. To achieve special effects, this diameter can be different. The membranes 42, 43 are at their outer rim attached to the housing 41. The membranes 42, 43 may be attached by fixing the membrane in between components of the housing 41. The holding rings 47, 48 are movable in the housing 41 in axial (z-direction) thereby deflecting the optically active and the with respect to housing 41 and chambers 44, 45, 46 sealing part of the thereto attached membrane. Due to the in general constant volume V inside the housing 41 the shape of the membranes 42, 43 is changed due to relocation of fluid in the chambers 44, 45, 46 such that the optical behaviour of the lens system is changed. A more simple lens system may be designed with one membrane only separating an in general constant volume of a housing in two separate chambers only.

By moving the holding rings 47, 48 in axial direction (z-direction) up and/or down it is possible to obtain e.g. a bi-convex, a bi-concave, a convex-concave, a concave-convex or a plane convex lens-system. In an embodiment the holding rings are actuated by magnetic fields from the outside. Alternative or in addition it is possible to actuate the rings by other means such as electric or magnetic field induced force transmission. If appropriate it is possible to functionally serially interconnect the lens systems as described above. Depending on the field of application it is also possible to provide a lens system having only one membrane separating the chamber in two areas.

A deflective force acting upon the membrane may be applied in different manners, respectively to the holding means of the membrane. In that e.g. the holding rings 47, 48 are attached to the membranes are interconnected to magnets, made out of a magnetic material, e.g. neodymium-iron-boron (NdFeB), or made out of a ferromagnetic material, it is possible to deflect the membranes remotely in the foreseen manner by applying a magnetic field from the outside and thereby adjusting the optical behaviour of the lens system through a completely sealed outer housing 41. One chamber can be open if filled with air. A magnetic field can be generated by an electrical coil which is arranged along the housing 41 and designed such that it generates an appropriate magnetic field. If more than one ring needs to be deflected it is possible to provide fore each ring an electrical coil. Alternatively or in addition the membrane can be deflected by a ring made out of or comprising magnetic or ferromagnetic material. The ring is arranged displaceable along the housing 41. In that the outer housing 41 is made out of a material which is transparent to a magnetic field it is possible to arranged the actuator outside and thereby remotely apply a deflecting force onto the membrane. In a further embodiment an actuator is made out of a bimetal or a shape memory alloy which have a shape which depends on the temperature of the material. These actuators are mechanically interconnected to the membrane via the holding means of the membrane and can e.g. be heated by electrical current such that the membrane is deflected accordingly.

Figure 8:
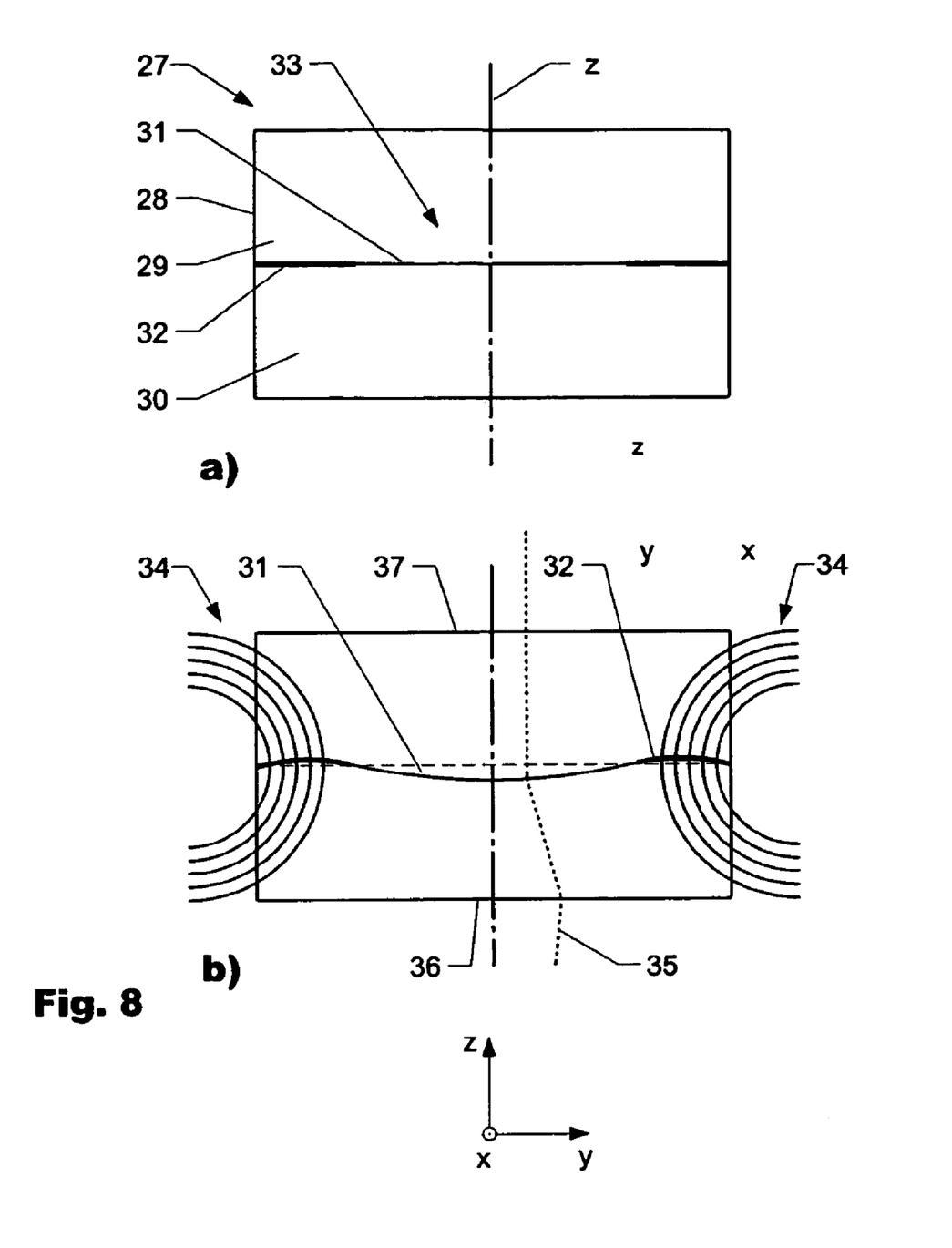
FIG. 8 A fourth embodiment of a lens system in schematic side view in two different modes of operation.

FIG. 8a and FIG. 8b are showing a fourth embodiment of a lens system 27 according to the invention. FIG. 8a shows the embodiment 27 in non-deflected manner and FIG. 8b in a deflected manner. The lens system 27 as shown has a rotation-symmetric setup with respect to the central axis z. If appropriate other designs having a square other shaped cross-section are possible. The lens system 27 comprises an at least partially optically transparent outer housing 28 which is separated into a first and a second chamber 29, 30 by a flexible membrane 31. Depending on the optical effect to be achieved the chambers 29, 30 are completely filled by the same or fluids (not shown in detail) having different index of refraction. The membrane 31 comprises an annular magnetic area 32 which encompasses the optically active central part 33 of the membrane 31 along its outer rim. The magnetic area 32 is made out of a magnetically active material (e.g. magnetic or ferromagnetic material). If appropriate a rigid of flexible ring made out of a magnetically active material can be incorporated in or attached to the outer area 32 of the membrane 31. The membrane 31 is preferably arranged in a manner that it exerts a certain reset force onto the fluids in the chambers 29, 30 such that the membrane returns after deflection itself into an equilibrium position. In general at least one of the fluids in the chambers 29, 30 is preferably of an incompressible type.

In FIG. 8b is shown how a magnetic field 34, schematically indicated by concentric circles, is applied to the magnetic layer 32. As a result a Force F occurs which acts upon the outer area 32 of the membrane 31 and locally deflects the membrane 31 in +z-direction. Thereby the fluids in the chambers 29, 30 are rearranged deflecting the central part of the membrane 31 in an opposite direction (−z-direction) such that the central part of the membrane adopts the shape of a calotte. A light beam 35, schematically indicated by a dashed line, passing through the lens system 1 in an in general +z-direction enters the outer housing 28 and the first fluid present in the first chamber 29 through a first end panel 36 in a perpendicular manner. Then it is deflected a first time by passing through the optically transparent membrane 31 while entering into the second fluid present in the second chamber 30. A second deflection of the light beam occurs while exiting the outer housing 28 through a second end panel 37. In that the magnetic field is augmented the deflection of the membrane is increased. Thereby it becomes possible to adjust the optical behaviour of the lens system. The magnetic field 34 can be generated by a coil 38 (see FIG. 17) arranged outside of the housing 28.

FIG. 9a and FIG. 9b are showing a fifth embodiment of an optical system 55 according to the invention. FIG. 9a shows the optical system 55 in an undeformed and FIG. 9b in a deformed manner. The optical system 55 comprises an outer housing 56 with a central opening 57 extending in axial direction z. At one end, the central opening 57 is closed by a rigid wall 58. A flexible membrane 59 extends across the opening 57 and is fixed at its outer end to outer housing 56. A chamber 60 having a volume V and which is filled by a fluid (liquid or gas) is delimited by the wall 58 and the membrane 59. An annular frame 61 is interconnected to the membrane 59 a certain distance d2 apart from the outer rim of the membrane 59. In that the annular frame 61 is pressed (here −z-direction) along a distal end directly or indirectly onto the surface of the membrane 59 the fluid inside the chamber 60 is rearranged and the membrane is deformed calotte-like as schematically shown in FIG. 9b in a convex manner. In that the chamber 60 is filled by a fluid having a different index of refraction, then the fluid present outside of the chamber 60 a light beam passing through the optical system is deflected according to a determined manner. In that the annular frame is pulled away (here +z-direction) the membrane is deformed in a concave manner (not shown). In that the chamber 60 is filled by an incompressible fluid such as oil or water, it is possible to keep the volume V in general constant and thereby determining the deformation of the membrane 59. The membrane 60 can be made assembled out of different sections, e.g. the inner optical active area can be made out of a different membrane material than the annular outer area. When the chamber 60 is filled by a compressible fluid such as a gas, the volume V alters when the annular frame 61 is pressed against the surface of the membrane causing thereby a deformation of the membrane 59. Alternatively or in addition, the volume V may be changed by heating or cooling.

Figure 9:
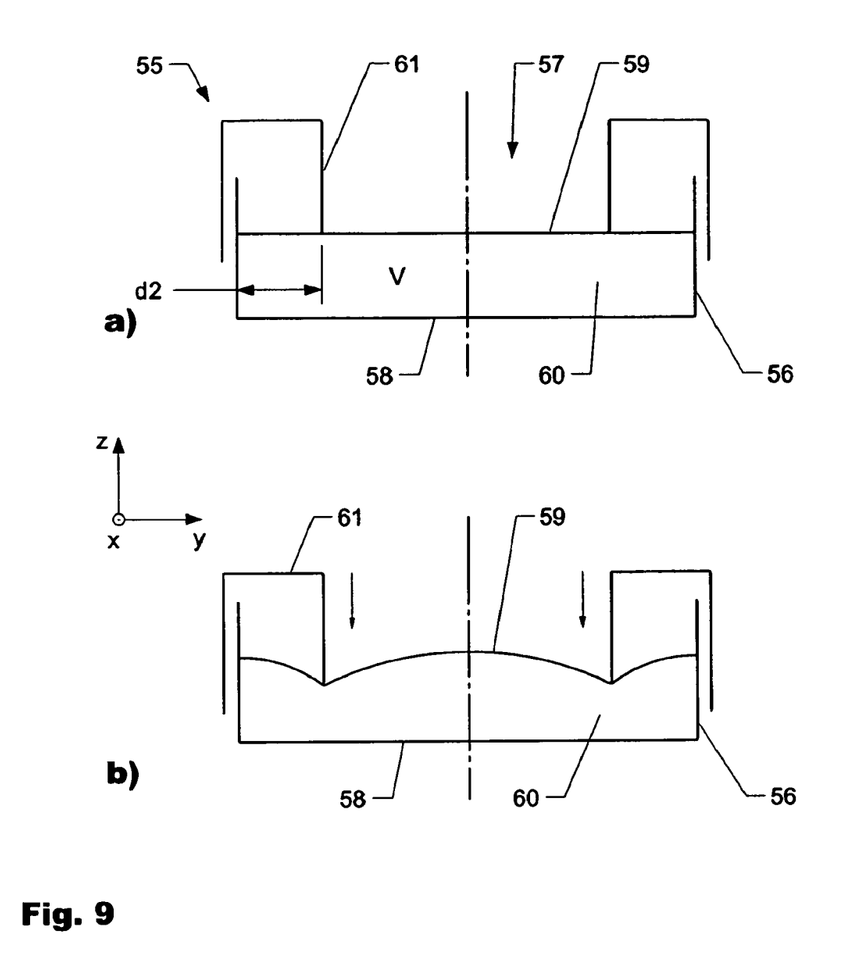
FIG. 9 A fifth embodiment of a lens system in schematic side view in two different modes of operation.

To displace the annular frame 60 with respect to the outer housing 56, the annular frame can be mechanically interconnected to the outer housing 56 e.g. by a thread or another appropriate means for linear displacement along the optical axis z. If appropriate, it is possible to functionally interconnected several optical system with each other. The optically active surface of the membrane 59 and/or the wall 58 may be equipped with diffractive elements or other optically active means. E.g. the wall 58 can be shaped as a rigid lens.

Figure 10:
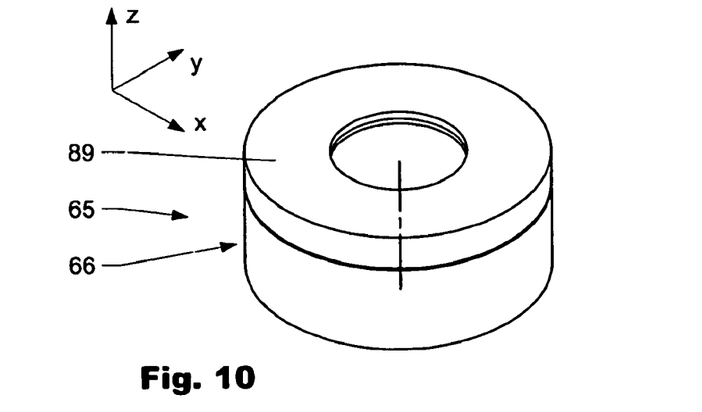
FIG. 10 A sixth embodiment of a lens system in a perspective manner.
Figures 11, 12:
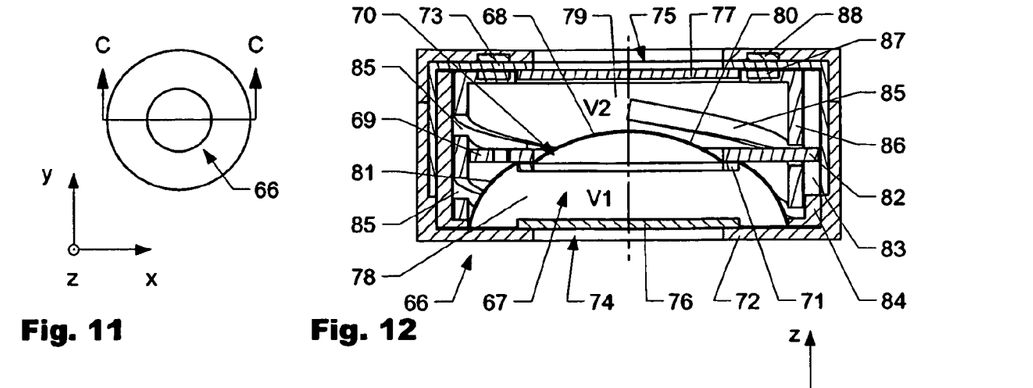
FIG. 11 The lens system according to FIG. 10 in a top view.
FIG. 12 The lens system according to FIG. 10 in a section view.
Figure 13:
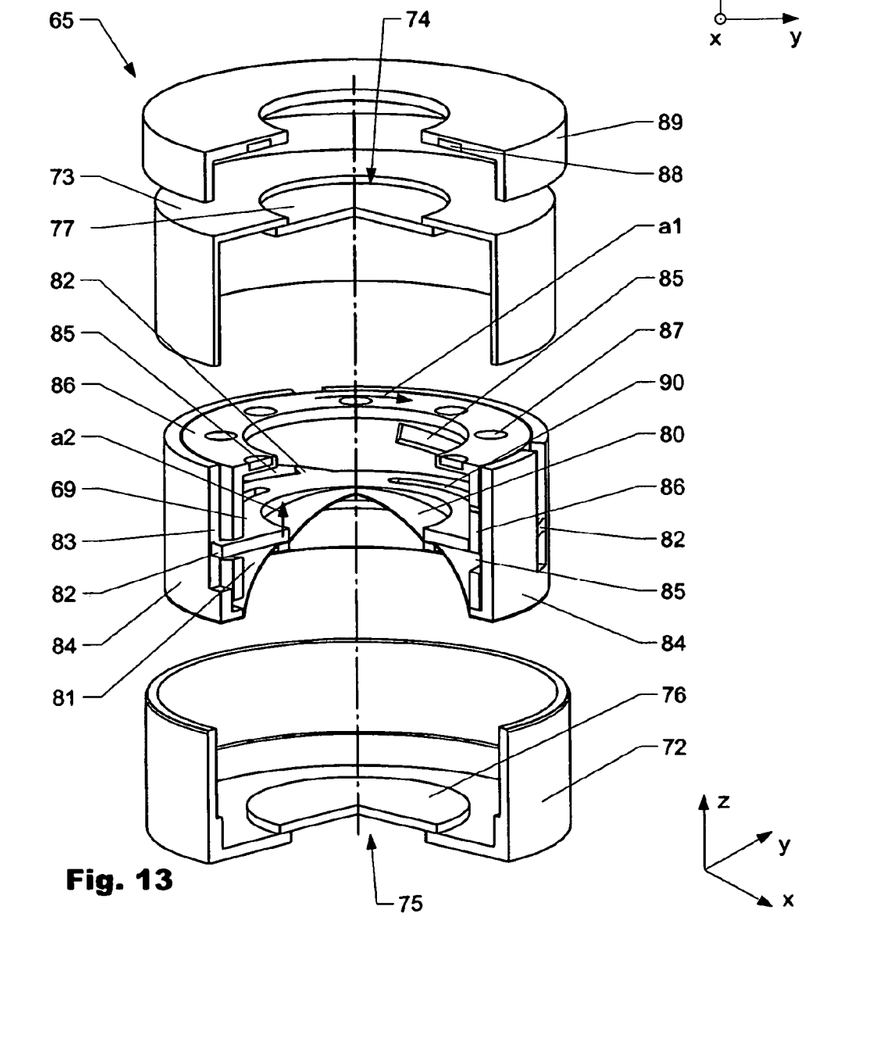
FIG. 13 The lens system according to FIG. 10 in an exploded view.

FIG. 10 schematically shows a sixth embodiment of a lens system 65 according to the invention in a perspective manner from above. FIG. 11 shows the lens system in a top view. FIG. 12 shows the lens system 65 in a section view along section line CC of FIG. 11 and FIG. 13 shows the lens system in an exploded manner. For better visibility of the internal setup, a section of 90° has been cut away.

The lens system 65 comprises an outer housing 66 with a central opening 67 (see FIGS. 12, 13) which encompasses a volume V. A membrane 68 made out of an elastic material extends across the central opening 67 and is attached in the shown embodiment at the lower end of the housing 66.

The membrane 68 is attached to a holding frame (carrier) 69, which has a circular opening 70, via a holding ring 71. Other fixations are possible. If appropriate, the membrane 68 can be assembled out of different sections having different properties. The holding frame 69 is arranged inside the central opening 67 displaceable in axial direction with respect to the outer housing 66 by a mechanism which is subsequently explained in more detail. The displaceable annular holding frame 69 and the thereto interconnected driving mechanism acts as actuator to displace at an intersection between an inner and an outer section 80, 81 of the membrane 68.

The central opening 67 of the outer housing 66 is closed on each end by a first and a second cover 72, 73, each comprising an opening 74, 75, which is sealed by a optically transparent glass 76, 77. The outer housing 66 and the first and the second cover 72, 73 may form a hermetically sealed case.

The membrane separates the inner volume V of the housing 66 in two chambers 78, 79 having a first and a second volume V1, V2. At least one of the chambers is sealed with respect to the environment such that it can hold an in general constant amount of fluid (not shown in detail). By the choice of an incompressible fluid, the volume can be kept constant. By displacing the holding frame 69 in axial direction z with respect to the outer housing 66, the at least one fluid inside the chambers V1, V2 is displaced and due to the constant amount deforms the membrane 68 in a predetermined manner. The holding frame 69 subdivides the membrane in an optically active inner section 80 and an optically non-active annular outer section 81. While the deformation of the inner section 80 is used for taking influence on a light beam passing the lens system 65 in axial direction, the outer section 81 is primarily used to compensate the movement and for sealing reason. Depending on the field of application, the inner and the outer sections 80, 81 of the membrane 68 must not be integrally connected. The membrane 68 is attached in an elastically stretched manner to the holding ring 69, which in the present embodiment is arranged at a certain distance to the outer rim of the membrane.

The mechanism to displace the membrane 68 and thereby to adjust the optical behaviour of the lens system 65 is described subsequently in more detail. The holding frame 69 comprises at its outer edge three radial pins 82, which each engage with a vertically arranged first notch 83 of a fixedly arrange first support 84 and a helically shaped second notch 85. The second notch 85 is arranged in a second support 86, which is arranged rotatably about the centre axis z. By rotating the second support 86 with respect to the first support 84 (indicated by arrow a1), the holding frame 69 is displaced in axial direction (arrow a2) and thereby the membrane 68 is deformed due to relocation of the fluid present in the at least one chamber 78, 79. In the present embodiment it depends on the size and the type of application if only one chamber is filled with a fluid. External forces or gravity can be compensated if both chambers are filled by incompressible fluids. Appropriate sealing will be necessary. As it can be seen in FIG. 12, the membrane 68 is clamped between the distal end of the first support 84 and the first cover 72. The first and the second cover 72, 73 completely seal the outer housing 66 with respect to the outside. The rotation of the second support 86 is transferred by first magnets 87, which are attached to the second support 86 and second magnets 88, which are attached to an outer turning ring 89. The first and the second magnets 87, 88 are functionally interconnected to each other through the second cover 73 via magnetic forces such that a rotation of the turning ring 89 is transmitted to the second support 86. Other arrangements of the magnets is possible. The holding frame 69 may comprise openings 90 or be designed in a skeletonised design to improve the exchange of fluid.

By moving the holding ring 69 in axial direction (z-direction) up and/or down, it is possible to obtain e.g. a plane-convex, a plane-concave, a or a plane-plane lens-system. In an embodiment the holding rings are actuated by magnetic fields from the outside. Thereby, a rotational movement is translated in an axial displacement of the holding ring by a mechanical force transmission mechanism consisting advantageously of a slot or a thread. The magnetic field can act in axial z-direction or in radial direction which is perpendicular to the z-direction. Alternative or in addition, it is possible to actuate the rings by pure mechanical force transmission using no electric nor a magnetic field induced force transmission. In this embodiment, the volume in one of the chambers 78, 79 is not necessarily constant but dust free. If appropriate, it is possible to functionally serially interconnect the lens systems as described above. If appropriate a CCD-array (not shown in detail) may be incorporate in or interconnected to one of the covers 74, 75.

Figure 14:
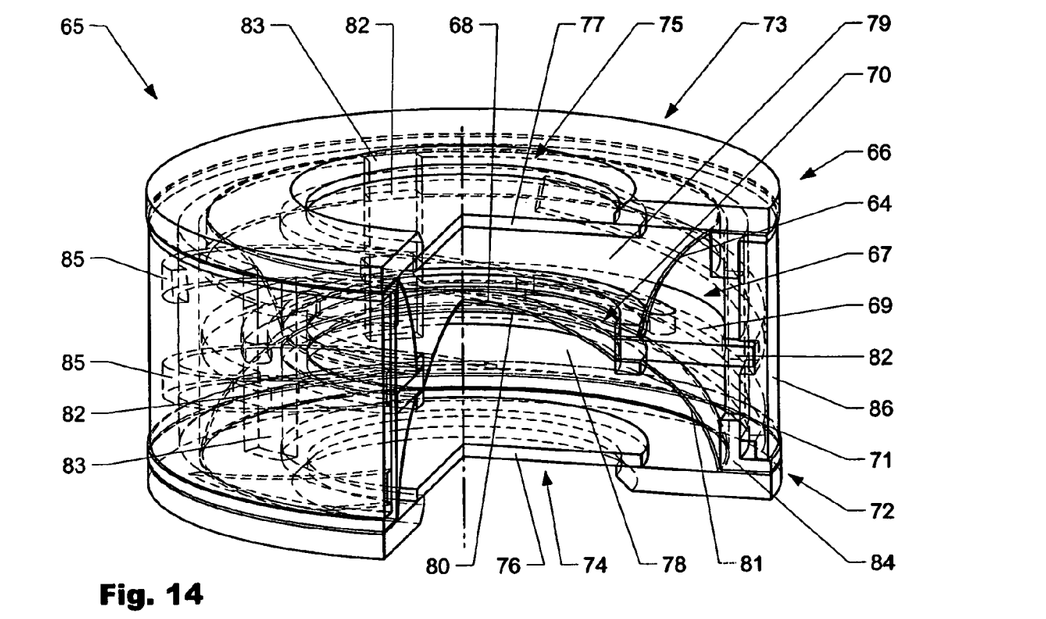
FIG. 14 A seventh embodiment of a lens system in a perspective view.

FIG. 14 schematically shows a seventh embodiment of a lens system 65 according to the invention in a perspective manner. For better understanding of the principle of function, a front part is cut away. In addition, the not visible edges are shown as dashed lines. Because this embodiment is related to the sixth embodiment according to the FIGS. 10 through 13, the same reference numbers are used for corresponding parts. With respect to the general description, it is referred to the sixth embodiment.

In difference to the sixth embodiment, the seventh embodiment 65 comprises a further membrane section 64, which delimits and seals a second chamber 79 with respect to the surrounding. In addition, the first fixedly arranged support 84 with the first notches 83 is arranged inside the second rotatably arranged support 86, which comprises the helical second notches 85. Thereby the holding frame 69 can be displaced by rotating the second support 86 with respect to the first support 84. Also here the holding frame 69 and the thereto interconnected mechanism acts as actuator for the membrane 68. The actuator acts upon the intersection between the optically active inner section 80 of the membrane 68 and the optically passive outer section 81 of the membrane 68.

The lens system 65 comprises two chambers 78, 79, which at least during operation have normally constant volumes. The volumes are defined by the elastic membrane sections 80, 81, 64 and the first and the second cover 72, 73. Inside the housing 66, the membrane sections 64, 80, 81 made out of an elastic material are attached at the housing 65 and the holding frame 69. In the shown embodiment, the outer membrane sections 64, 81 are attached by clamping between the components 72, 74, 84 of the housing. A inner optically active, elastic membrane section 80 is arranged such that it separates the inner volume of the housing 66 in two chambers 78, 79. The membrane sections 64, 80, 81 are normally attached in a stretched manner to the holding frame 69. As described in accordance with the sixth embodiment, the holding frame 69 is movable in the housing 66 in axial (z-direction) thereby deflecting the three membrane sections 64, 80, 81. Due to the in general constant amount of fluid volume inside the chambers 78, 79 the shape of the optically active membrane 80 is changed due to relocation of fluid in the chambers 78, 79 such that the optical behaviour of the lens system 65 is changed.

By moving the holding frame 69 in axial direction (z-direction) up and/or down it is possible to obtain e.g. a plane-convex, a plane-concave, a or a plane-plane lens-system. In the shown embodiment, a rotational movement is translated in an axial displacement of the holding frame 69 using advantageously a slot or a thread mechanism. Other axial actuation is possible. Alternative or in addition, it is possible to actuate the rings by other means such as electric or magnetic field induced force transmission. If appropriate, it is possible to functionally serially interconnect the lens systems as described above. If appropriate, the outer membrane sections 64, 81 can be made out of a porous material such that gas bubbles in a liquid in the chambers 78, 79 can escape. In the shown embodiment one outer membrane section 64, 81 can in principle be left away when only one chamber 78, 79 is sufficient for proper operation.

Figures 15, 16:
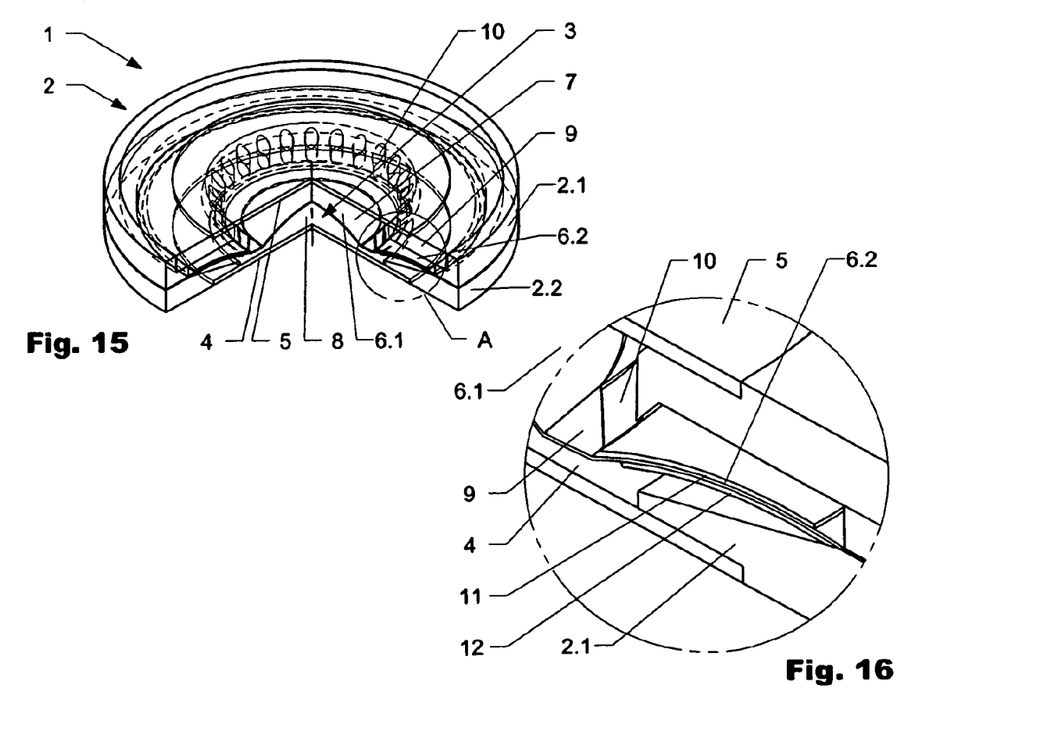
FIG. 15 An eight embodiment of a lens system in a perspective manner.
FIG. 16 Detail A of FIG. 15.

FIG. 15 is showing an eighth embodiment of a lens system 1, which is related to the first embodiment according to the FIGS. 1 through 4, the same reference numbers are used for corresponding parts. With respect to the general description, it is referred to the first embodiment. For better understanding of the principle of function a front section of 90° is cut away. In addition, the not visible edges are shown as dashed lines. FIG. 16 is showing detail A of FIG. 15.

The first upper electrode 11 has an extended length in the direction of the circular holding frame 9 and is thereby electrically interconnected to the holding frame 9. The holding frame is made out of an electrically conductive material. Alternatively or in addition, it can also be plated by an electrically conductive material. Thereby, it is possible to make the holding frame 9 out of plastic material. The second lower electrode 12 extends outwardly and is electrically interconnected to the lower part of the outer housing 2.1. The membrane 6 can act as isolation between the housing 2 and the holding frame 9. The area of the membrane 6 is not covered by the electrodes 11, 12 acts as a compensation for stress occurring in the membrane.

Figure 17:
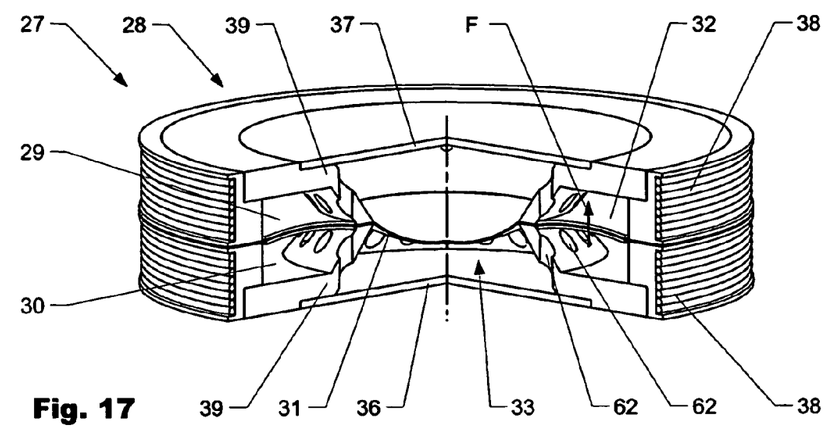
FIG. 17 A ninth embodiment of a lens system in a perspective manner.

FIG. 17 is showing a ninth embodiment of a lens system in a perspective manner. For better understanding and visibility, a front section is cut away, such that the inside of the lens system is visible. The lens system is related to the embodiment according to FIG. 8. Therefore the same reference signs are used. With respect to the general description it is referred to FIG. 8.

The lens system 27 as shown has a rotation-symmetric setup with respect to the central axis z. The lens system 27 comprises an at least partially optically transparent outer housing 28, which is separated into a first and a second chamber 29, 30 by a flexible membrane 31. The membrane is displayed in a deflected manner. Depending on the optical effect to be achieved, the chambers 29, 30 are completely filled by the same or different fluids (not shown in detail) having different index of refraction. The membrane 31 comprises an annular magnetic area 32, which encompasses the optically active central part 33 of the membrane 31 along its outer rim. The magnetic area 32 is made out of a magnetically active material (e.g. magnetic or ferromagnetic material). If appropriate, the magnetic active material can be incorporated in the membrane or attached to it separately. The membrane 31 is preferably arranged in a manner that it exerts a certain reset force onto the fluids in the chambers 29, 30 such that the membrane returns after deflection itself into an equilibrium position. In general at least one of the fluids in the chambers 29, 30 is preferably of an incompressible type.

A magnetic field 34 (see FIG. 8) is generated by coil 38 and acts upon the magnetic layer 32. As a result a Force F (see arrow) acts upon the outer area 32 of the membrane 31 and locally deflects the membrane 31 in upwardly +z-direction. Thereby the fluids in the chambers 29, 30 are re-arranged deflecting the central part of the membrane 31 in an opposite direction (−z-direction) such that the central part of the membrane adopts the shape of a calotte. The shown embodiment comprises an upper and a lower holding frame 39 which clamp the membrane 31 in axial direction and separate the membrane 31 in the optically active inner section 33 and the actuating outer section 32. The inner and the outer sections 32, 33 can be made out of different membrane materials. The holding frame 39 comprises openings 62 to exchange, resp. rearrange fluid as a result of the deflection of the membrane 31. The optically active inner section 33 of the membrane is deflecting due to the relocation of the fluid because the total amount of fluid (volume) remains constant. Depending on the field of application only one chamber 29, 30 is filled with fluid. With larger assemblies this can lead to distortion due to gravity forces. In the shown embodiment the coil 38 is separated in an upper and a lower section which are in axial arranged above, resp. bellow the central plane of the membrane 31.

Figure 18:
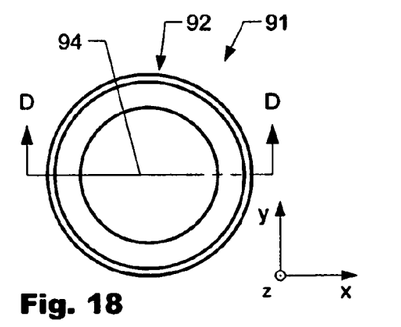
FIG. 18 A top view of a tenth embodiment of a lens system.
Figure 19:
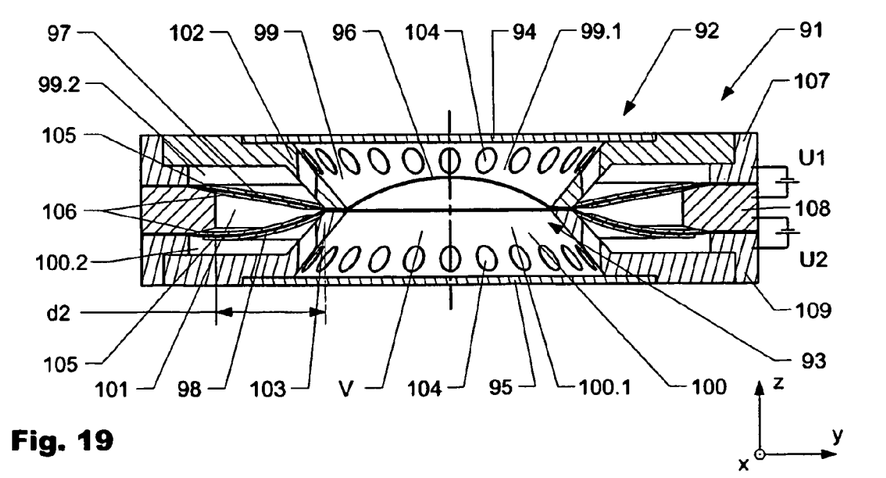
FIG. 19 A section view along section line DD of FIG. 18.

FIGS. 18 and 19 show a tenth embodiment of a lens system 91 according to the invention. FIG. 18 shows a top view and FIG. 19 a section view along section line DD of FIG. 18.

The lens system 91 comprises an outer housing 92 with a central opening 93 which extends in axial direction (z-axis) through the housing 92. The central opening 93 is closed on either side of the housing 92 by an upper and a lower panel 94, 95 encompassing a volume V. Three membrane sections 96, 97, 98 separate the volume V in three chambers 99, 100, 101 which are filled by a fluid (not shown in detail). In the shown embodiment the membrane sections 99, 100, 101 are fixed at the outer end in a prestretched manner to the outer housing 99, respectively to an upper and a lower holding frame 102, 103, here by clamping the membrane between different parts of the housing 92. In the shown embodiment the holding frames 102, 103 are arranged concentrically to the outer housing 92 at a distance d2 with respect an inner side wall of the housing 92. All membranes 96, 97, 98 are mounted in a prestretched manner under elastic tension. During the process of making of the lens system 91, the membranes 96, 97, 98 are stretched in stages such that the elastic tension of the optically active membrane section 96 is less than the elastic tension of the outer membrane sections 97, 98. However, in certain embodiments it is not necessary to prestretch the membranes, e.g. when the initial shape is determined by the volume filled in the chambers.

In the shown embodiment the mechanical coupling between the optically active membrane 96 and the actuator membranes 97, 98 primarily takes place by the fluid contained in the three chambers 99, 100, 101. The holding frames 102, 103 comprise openings 104, which allow the exchange of the fluid between first inner and a second outer sections 99.1, 99.2, 100.1, 100.2 of the chambers 99, 100.

The volume of the three chambers 99, 100, 101 is chosen such that the optically active membrane section 96 is flat and the actuator membrane sections 97, 98 are strained. If appropriate, the optically active membrane can be preformed, most likely in a calotte-like form.

On both actuator membranes 97, 98 a first upper and a second lower electrode 105, 106 are arranged opposite to each other on the surfaces of the actuator membranes 97, 98. Good results are achieved in that the electrodes 105, 106 are made out of carbon black by stamping them onto the membrane, by ion implantation processes, or by the application of flexible or liquid metals such as Galinstan. Alternative type of electrodes may be appropriate. The electrodes are electrically interconnected to the outside by electrical connectors, in the shown embodiment integrated into outer frames 107, 108, 109 forming the side of the outer housing 92. By applying a first and/or a second voltage U1, U2 the electrodes 105, 106 encompassing the outer membrane sections 97, 98 attract each other due to Coulomb forces, resp. Maxwell stresses, and thereby compress the strained membrane 97, 98 arranged in between. Due to the Poisson's ratio of the material, the membrane expands laterally thereby increasing its radial and circumferential size. This change in geometry also reduces, resp. modifies the stress in the material of the actuator membrane 97, 98. Due to the reason that the stress in the passive actuator membrane 98 now exceeds the stress in the active actuator 97 membrane, the passive actuator 98 membrane and optically active membrane 96 get deformed, which results in a change of the optical characteristics. To achieve a deformation of the optically active membrane 96 in opposite z-direction, the actuator membrane 97 is passive (U1=0) and the actuator membrane 98 is active (U2≠0).

REFERENCE SIGNS z Central Axis
F Deflecting Force
d1 diameter membrane
d2 radial distance
1 Lens system (first embodiment)
2 Outer housing
3 Opening in housing (axial)
4 Lower rigid panel
5 Upper rigid panel
6 Membrane
  a. 6.1 inner area
  b. 6.2 outer area
7 First upper chamber
8 Second lower chamber
  a. First inner part
  b. Second outer part
9 Annular holding frame
10 Opening in the holding frame
11 First upper electrode
12 Second lower electrode
13 Outer housing
14 First Chamber
15 Second Chamber
16 Membrane
17 Magnetic membrane
18 Centre area of membrane
19 Magnetic Field
20 Lens system (second embodiment)
21 Membrane upper system
22 Membrane lower system
23 First end panel
24 Second end panel
25 Light beam
26 Inner side wall of outer housing
27 Lens system (fourth embodiment)
28 Outer housing
29 First chamber
30 Second chamber
31 Membrane
32 Magnetic area
33 Optical active central part
34 Magnetic field
35 Light beam
36 First end panel
37 Second end panel
38 Coil
39 Annular holding frame
40 Lens system (third embodiment)
41 Outer housing
42 First membrane
43 Second membrane
44 First chamber
45 Second chamber
46 Third chamber
47 First holding ring
48 Second holding ring
49 Lens system (fifth embodiment)
50 Outer housing
51 First Chamber
52 Second Chamber
53 Compartment
54 Bracket
55 Optical system
56 Outer housing
57 Central opening
58 Wall
59 Membrane
60 Chamber
61 Annular holding means
62 Opening to exchange fluid
63
64 Further membrane section
65 Lens system (sixth embodiment)
66 Outer housing
67 Central opening
68 Membrane
69 Holding frame
70 Circular opening
71 Holding ring
72 First cover
73 Second cover
74 Opening in first cover
75 Opening in second cover
76 First glass
77 Second glass
78 First chamber
79 Second chamber
80 Inner section of membrane
81 Outer section of membrane 82 Radial pins
83 First notch
84 First support (fixed)
85 Second notch
86 Second support (rotatably)
87 First magnets
88 Second magnets
89 Turning ring
90 Openings to exchange fluid
91 Lens system (tenth embodiment)
92 Outer housing
93 Central opening
94 Upper rigid panel
95 Lower rigid panel
96 First membrane section
97 Second membrane section
98 Third membrane section
99 First chamber
100 Second chamber
101 Third chamber
102 First holding frame
103 Second holding frame
104 Opening for fluid
105 Upper electrode
106 Lower electrode

The invention claimed is:

1. An optical system comprising a housing with an opening extending in an axial direction and at least one membrane arranged across the opening, defining at the inside of the housing at least one chamber filled with an in general constant amount of a fluid, wherein the membrane comprises an optically active and an optically passive section and at least one actuator to influence a geometry of the optically active section of the membrane by relocation of the fluid, thereby changing the optical characteristics of the optical system wherein the optically active and the optically passive section of the membrane are attached to at least one annular holding frame the annular holding frame separates the membrane into the optically active and optically passive sections, the actuator is interconnected to the annular holding frame to displace the annular holding frame in said axial direction with respect to said housing, the annular holding frame is arranged at a distance to an inner side of the opening
said membrane is attached in an elastically stretched manner to said annular holding frame and/or said opening,
said actuator comprises a first support and a second support and is adapted to translate a rotational movement of said first support with respect to said second support into an axial displacement of said annular holding frame with respect to said housing.

2. The optical system according to claim 1, wherein the optically active and the optically passive section of the membrane are attached to the same annular holding frame.

3. The optical system according to claim 1, wherein the actuator is interconnected to the optically passive section of the membrane.

4. The optical system according to claim 1, wherein the housing encompasses an in general constant volume (V) and the at least one membrane separates the inside of the housing into a first and a second chamber filled with a first and a second fluid having the same or a different index of refraction.

5. The optical system according to claim 1, wherein the actuator to displace the at least one membrane is arranged inside the housing.

6. The optical system according to claim 5, wherein the actuator to displace the membrane is controlled from the outside of the housing by an electrical signal.

7. The optical system according to claim 1, wherein the actuator to displace the membrane is actuated from the outside of the housing by an electrical field, a magnetic field or by a direct mechanical force transmission mechanism.

8. The optical system according to claim 1, wherein the optically active section of the membrane contains rigid, absorbing, refractive, diffractive, diffusive or reflective structures.

9. The optical system of claim 1 wherein said optically active section of said membrane is adapted to obtain a convex, a concave, and a plane shape.

10. The optical system of claim 1 wherein said actuator comprises an axially arranged first notch and a helically shaped second notch.

11. The optical system of claim 10 wherein said optical system further comprises pins which are adapted to be connected to said annular holding frame and to engage said axially arranged first notch and said helically shaped second notch.

12. An optical system comprising
a housing with an opening extending in axial direction,
at least one membrane arranged across the opening, defining at the inside of the housing at least one chamber filled with an in general constant amount of a fluid, wherein the membrane comprises an optically active and an optically passive section,
at least one actuator adapted to influence a geometry of the optically active section of the membrane by relocation of the fluid, thereby changing optical characteristics of the optical system, and
an annular holding frame arranged at a distance from an inner surface of the opening and separating said membrane into the optically active and the optically passive section, wherein the optically active and the optically passive section of the membrane are attached to the annular holding frame,
wherein said actuator comprises a first support and a second support and is adapted to translate a rotational movement of said first support with respect to said second support into an axial displacement of said annular holding frame with respect to said housing.

13. The optical system of claim 12 further comprising pins connected to said annular holding frame and engaging an axially arranged notch of said first support and a helically arranged notch of said second support.

* * * * *